May 15, 1956 J. O. PREISIG 2,745,986

ADJUSTABLE VOLTAGE SUPPLY

Filed March 5, 1954

INVENTOR.
JOSEPH O. PREISIG
BY
ATTORNEY

United States Patent Office 2,745,986
Patented May 15, 1956

2,745,986

ADJUSTABLE VOLTAGE SUPPLY

Joseph O. Preisig, Trenton, N. J., assignor to Radio Corporation of America, a corporation of Delaware Application March 5, 1954, Serial No. 414,417

7 Claims. (Cl. 315—22)

This invention relates generally to voltage supplies and more particularly to adjustable voltage supplies of the type suitable for use in satisfying the adjustable focus voltage requirements of a cathode ray tube.

In cathode ray tubes, beam focusing may be effected electromagnetically or electrostatically. The use of electrostatic focusing is quite extensively practiced in most color kinescopes presently contemplated. The focus voltage requirements for a typical tricolor kinescope, such as one of the three-gun shadow-mask type described in the article by H. B. Law entitled "A three-gun shadow-mask kinescope," appearing in the October 1951 issue of the Proceedings of the I. R. E., are significantly more severe than those of an electrostatically focused black-and-white kinescope. To satisfy the focus voltage and current requirements of a color kinescope with the requisite regulation and without excessive power losses requires improvement over the performance of the usual type of focus voltage supply heretofore used for black-and-white kinescopes of the electrostatic focusing type.

It is a conventional practice to develop a focus voltage for an electrostatically focused kinescope via rectification of the high amplitude transient voltage pulse appearing in the kinescope's associated horizontal deflection wave output transformer during the retrace period of the line scanning cycle, when cutoff of the horizontal output tube causes a sudden collapse of the magnetic field of the horizontal deflection yoke. The usual focus voltage supply of this type simply involves tapping the horizontal output transformer at a point of pulse potential corresponding to the maximum focus voltage desired, connecting a diode and a series bleeder resistance between the tap and a point of reference potential, and adjustably tapping the bleeder resistance to derive the variable focus voltage.

The basic problem in the use of a simple bleeder type supply as above described resides in the necessity for effecting a compromise between the desire to minimize the impedance of the bleeder so as to improve the regulation of the supply, and the desire to increase the size of the bleeder resistance to minimize the current and power "robbed" from the deflection transformer by the bleeder. Since focusing voltage variations with loading are even less tolerable in a color kinescope, the focusing supply regulation is even more critical in a color kinescope than in a black-and-white kinescope. On the other hand, since the increased high voltage requirements of a color kinescope further burden the deflection output transformer, avoidance of an increase, and preferably achievement of a decrease, in the power losses in the focus supply is highly desirable.

In accordance with the present invention a novel adjustable voltage supply of low source impedance is provided, which may satisfactorily serve as the variable focus supply for a color kinescope in an effective solution to the above stated regulation vs. power loss problem. By use of the present invention an improvement in regulation over conventional focus supplies may be achieved without increasing power losses therein, or a comparable regulation may be realized with a considerable saving in power losses.

In accordance with an embodiment of the present invention such results may be achieved by the use of a pair of rectifiers and a bleeder resistance in series therewith, one rectifier tapping the output transformer at a point of pulse potential corresponding to the maximum focus voltage required, and the other rectifier tapping the output transformer at a point of pulse potential corresponding to the minimum focus voltage required. The bleeder is thus subject only to a voltage comparable to the width of the required range of focus voltage variations, rather than being subject to a voltage of the magnitude of the maximum focus voltage required, as in the focus supplies of the prior art. Hence, for comparable current and power losses, a smaller bleeder resistance may be employed, with a consequent improvement in regulation, or conversely, for comparable regulation a significant decrease in power losses may be obtained.

A primary object of the present invention therefore is to provide a novel and improved adjustable voltage supply.

A further object of the present invention is to provide a novel and improved voltage supply which may serve as the variable focus supply for a cathode ray tube, whereby improved regulation may be achieved without increasing power losses, or conversely wherein power losses may be decreased without degrading regulation.

It is an additional object of the present invention to provide a color television receiver with a novel and improved adjustable focus supply.

Other objects and advantages of the present invention will become readily apparent to those skilled in the art upon a reading of the following detailed description and an inspection of the accompanying drawing in which.

Figures 1, 2:
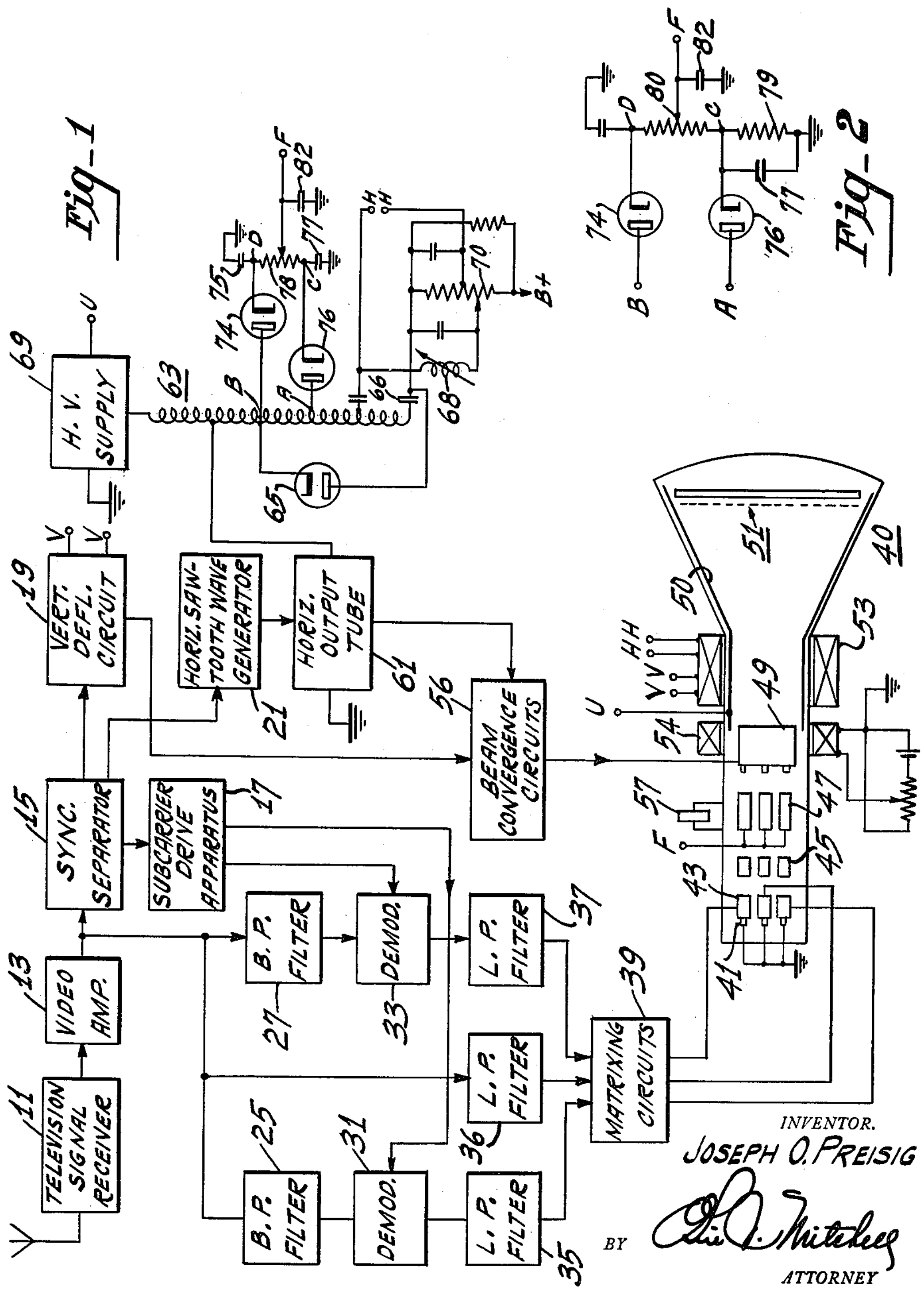
Figure 1 illustrates in block and schematic form a television receiver including a variable focus supply in accordance with an embodiment of the present invention.
Figure 2 illustrates schematically a modification of the novel focus supply of Figure 1 in accordance with another embodiment of the present invention.

Referring to the drawing in greater detail, an adjustable voltage supply in accordance with an embodiment of the invention is illustrated as supplying the variable focusing voltage required by a color kinescope in a color television receiver. While the particular use of the present invention in a color television receiver is thus indicated, it will be appreciated that the invention may also be employed as a supply for other purposes, such as supplying the variable focus voltage required by an electrostatically focused black-and-white kinescope in a monochrome television receiver.

The illustrated receiver is generally representative of presently contemplated color receivers for a simultaneous subcarrier type color television system in accordance with the revised F. C. C. color standards, and is in general accord with the principles and apparatus discussed in the article entitled "Principles and development of color television systems," by G. H. Brown and D. G. C. Luck appearing in the June 1953 issue of the RCA Review. Carrier waves modulated by a composite color picture signal are illustrated as being received by conventional signal receiving apparatus 11 which may include the usual R. F. tuner, converting apparatus, I. F. amplifier, signal detector, etc. The video frequency signals recovered from the modulated carrier in the receiving apparatus 11 are amplified in the video amplifier 13. Synchronizing information is derived from the recovered signals in the sync separator 15 and utilized to synchronously control the receiver's subcarrier drive apparatus 17, to control the generation of scanning waves in the vertical deflection circuits 19, and to control the generation of horizontal frequency sawtooth voltage waves in the horizontal sawtooth wave generator 21. Respective color mixture signals (e. g. narrow band $E_Q$ signals and wider band $E_I$ signals, discussed in detail in the aforementioned article) are recovered from the video signal output of amplifier 13 in respective color demodulator channels which include bandpass filters 25 and 27 of respectively appropriate passbands, synchronous demodulators 31 and 33 receiving respectively appropriate phases of the output of the subcarrier drive apparatus 17, and low pass filters 35 and 37 having the respective appropriate narrow and wider responses. The receiver is also provided with a brightness channel, including a low pass filter 36 having the desired wide band response, through which the broad band monochrome portion of the composite signal may pass. The outputs of the brightness channel and two color channels are suitably combined in the matrixing circuits 39 of the receiver to form the simultaneous color signals which may be applied to appropriate elements of a color image reproducer 40.

The color image reproducer 40 is illustrated schematically as being of the three-gun, shadow-mask kinescope type. Color image reproducers of this general type are discussed in some detail in the aforementioned article by H. B. Law entitled "A three-gun shadow-mask color kinescope." In a color image reproducer of this type, three electron beams are used, one for each primary color. The beams strike a phosphor screen composed of a regular array of red-, green-, and blue-emitting phosphor dots. Between the electron gun position and the phosphor screen there is placed a thin perforated metal sheet for the purpose of partially masking the electron beams. The phosphor dot array on the screen comprises a plurality of closely spaced phosphor dot trios, each trio consisting of a red-, green-, and blue-emitting phosphor dot with the centers of the dots lying at the corners of an equilateral triangle. The trios themselves lie at the corners of an equilateral triangle of larger size. Assocated with each of the phosphor trios is a hole in the video mask, these holes also being located at the corners of an equilateral triangle. The three beams, disposed 120° apart about the tube axis, are converged to a point on the mask by suitable static and dynamic beam converging means. The electron beam which is to contribute the red portion of the picture is prevented, by the mask, from striking those areas on the screen containing blue and green emitting phosphors. Likewise the green and blue beams can strike only the green and blue emitting phosphor dots, respectively. The target structure 51 of the illustrative color kinescope 40 may be considered to be of the general shadow-mask type above described.

As schematically illustrated, the three electron beams are developed and shaped in respective electron gun structures, each including a thermionic cathode 41, a control 43, a first anode or accelerating electrode 45, and a focusing electrode 47. The electron gun structures may be of the general type disclosed in the co-pending application of Hannah C. Moodey, Ser. No. 295,225, filed June 24, 1952, and disposed symmetrically about the tube axis such as to produce three substantially parallel beams as in said Moodey application, or may be inclined at respective angles to the tube axis so as to provide three beams substantially converging at a common point on the target, as in the co-pending application of Albert M. Morrell, Ser. No. 364,041, filed on June 25, 1953.

A common convergence anode 49 is illustrated, which, when energized by suitable dynamic convergence waveforms generated in the beam convergence circuits 56 along with an appropriate (static convergence) D.-C. component, serves to converge the three beams to a common point in the plane of the shadow-mask of target structure 51 throughout the scanning of the raster. The principles of multibeam convergence, and a description of typical circuits for developing dynamic convergence waveforms from sawtooth waves of field and line frequency, may be found in an article by Albert W. Friend appearing in the October 1951 issue of the Proceedings of the I. R. E. and entitled "Deflection and convergence in color kinescopes." As illustrated, the beam convergence circuits may derive the respective sawtooth information from the vertical deflection circuits 19 and the horizontal output system 61, and convert these sawtooth waves into essentially parabolic waveforms, as disclosed in the aforementioned Friend article, for combined application with a D.-C. component as a suitable convergence waveform to the common convergence electrode 49

While the use of electrostatic convergence apparatus has thus been illustrated, an alternative is the use of electromagnetic convergence apparatus such as disclosed in the co-pending application of Hunter C. Goodrich, entitled "Electromagnetic Beam Convergence Systems for Tri-color Kinescopes," Ser. No. 322,653, filed November 26, 1952, now United States Patent No. 2,707,248, issued April 26, 1955, in the aforesaid co-pending Morrell application, and in another co-pending application of the aforesaid Morrell, Ser. No. 383,340, filed September 30, 1953, and entitled "Tri-color Kinescope." In the latter two applications, the incorporation of internal pole pieces in such electromagnetic convergence apparatus is disclosed.

Three beam alignment magnets 57, one associated with each of the three electron beams may be employed to provide individual correction of beam misalignment, as disclosed in the aforementioned Friend article. However, where electromagnetic convergence apparatus is employed of the nature providing individual control of the three beams in respective radial directions relative to the tube axis, as in the aforementioned Goodrich and Morrell applications, a single beam alignment magnet providing control of a selected one of the beams in a direction perpendicular to the radial convergence control direction associated with that beam is sufficient, again as indicated in the aforementioned Goodrich and Morrell applications. In such a case the single beam alignment magnet may take the form of an adjustably insertable magnet associated with cooperating external and internal pole pieces, as disclosed in the co-pending application of Max Obert, Ser. No. 405,445, filed January 21, 1954, and entitled "Electron Beam Control Means."

In addition to the beam controlling apparatus already described, the illustrated color kinescope 40 is also provided, as is generally customary, with a "color purity" yoke 54, applying a uniform transverse magnetic field to all the electron beams to orient the system of beams as desired. The yoke may comprise either a rotatable single pair of coils, or two fixed pairs of coils at right angles, fed from an adjustable source of D.-C. (as indicated on the drawing). The use of such a "purity coil" to deflect the three beams equally so that they may be adjusted to pass through their respective color centers is explained in greater detail in the aforesaid Friend article, and in the co-pending application of Friend, Ser. No. 202,185, filed December 22, 1950, and entitled "Beam Alignment Device," now United States Patent No. 2,719,249, issued September 27, 1955.

The kinescope is provided, as is conventional, with a final accelerating electrode, the ultor 50, which may take the usual form of a conductive coating on the inner surface of the kinescope 40 extending from the vicinity of the convergence electrode 49 to the beam target structure 52. Where the flared portion of the kinescope envelope is itself a conducting metal, the conductive coating need only extend forward suffciently to make electrical contact with the metal flared portion. Operating potential for the ultor 50 is developed in a suitable high voltage supply 69, which may, as illustrated, be of the pulse type involving rectification of flyback pulses appearing periodically in a horizontal deflection wave output transformer 63. The high voltage supply 69 may also conveniently serve as the source of D.-C. (static convergence) voltage for the convergence anode 49.

To effect deflection of the three beams to trace a scanning raster on the target structure 51, a deflection yoke 53 is provided with appropriately disposed horizontal and vertical deflection windings. The yoke 53 is illustrated as having vertical yoke terminals V—V, to which field frequency scanning waves developed in the vertical deflection circuits 19 are applied. The horizontal yoke terminals H—H derive line frequency scanning waves from the horizontal output transformer 63, energized by a current developed in the horizontal output tube 61 to provide the desired scanning sawtooth in the horizontal yoke. The illustrated horizontal output transformer 63 is of the autotransformer type, the output of the horizontal output tube 61 being applied across a selected portion of the total series of windings, and the horizontal yoke being effectively coupled across a smaller segment of this portion.

To prevent the transient flyback pulses generated during retrace periods from setting up a series of oscillations, and in accordance with well-known reaction scanning principles, a damper tube 65 is provided. The details of yoke and damper connections and associated circuitry, including the provision of a B-boost capacitor 66, a width control inductance 68, horizontal centering potentiometer 70, etc., are illustrative only, and various modifications, augmentations or revisions thereof may be achieved without departing from the scope of the present invention, the particularly novel feature of which resides, in the illustrated embodiment, in the focus supply now to be described.

As illustrated in the drawing, a pair of rectifiers, diodes 74 and 76, are connected to respective spaced intermediate points on the windings of the horizontal output transformer 63. The plate of diode 74 taps the output transformer 63 at a point "B," a point of flyback pulse potential substantially corresponding in magnitude to the maximum focus voltage desired. The plate of diode 76 taps the output transformer 63 at a point "A," a point of flyback pulse potential corresponding in magnitude to the minimum focus voltage desired. Capacitors 75 and 77 connect the respective cathodes of diodes 74 and 76 to a point of reference potential (i. e. ground in the illustrative embodiment). The rectification of flyback pulses by diode 74 develops at the cathode side of capacitor 75 (point "D") a D.-C. potential corresponding to the aforesaid maximum focus voltage. Similarly the rectification of flyback pulses by diode 76 develops a D.-C. potential at the cathode side of capacitor 77 (point "C") corresponding to the desired minimum. A bleeder resistance 78 is connected between points "C" and "D." The focus supply terminal "F" to which the focus electrodes of the kinescope 40 are coupled is connected to the bleeder 78 by an adjustable tap 80. A capacitor 82 is coupled between the focus supply terminal "F" and ground. Variation of the focus voltage in the desired range is simply effected by adjusting the position of tap 80 on the bleeder 78.

The advantages of a focus supply as above described over the usual bleeder type supply (in which diode 76 would be omitted, and bleeder 78 would be connected between point "D" and ground) are readily apparent. In the conventional single-rectifier bleeder-type supply, a bleeder of appropriate size to provide acceptable regulation would draw a current of such magnitude as to involve significant $I^2R$ power losses. However, with a supply in accordance with the described embodiment of the present invention, wherein the voltage impressed across the bleeder is of the magnitude of the width of the desired focus range, rather than comparable to the maximum voltage desired, either the bleeder may be reduced in resistance to provide improved regulation with no greater power losses, or may be comparable in size to achieve similar regulation with a significant decrease in power losses.

Figure 2 illustrates a modification of the focus supply of Figure 1 in accordance with another embodiment of the present invention. It is noted that the supply of Figure 2 differs from that of Figure 1 in that an additional resistor 79 is included, the resistor 79 being connected between point "C" and ground. The supply illustrated in Figure 2 thus more closely resembles the conventional bleeder-type supply in that it effectively includes a bleeder connected between a point of maximum focus potential and ground. However, the inclusion of the second rectifier and its coupling to an appropriate intermediate point on the bleeder provides improved results of a nature similar to that provided by the supply of Figure 1.

To appreciate such improvements, a direct comparison shall be made between the supply of Figure 2, and a supply of conventional type in which rectifier 76 is omitted. As a practical example, it may be assumed that the bleeder of the conventional single rectifier supply comprises, in series, a variably tapped resistance 78 of a 5 megohm value and an untapped resistance 79 of 7 megohms value. Assuming that the tap 80 is at the midpoint of resistance 78 and current is being drawn by the focus electrode, it will be appreciated that the source impedance presented to terminal "F" would be equal to $$\frac{2.5\times 9.5}{12.0}$$

or approximately 2 megohms. Under the same conditions, but where rectifier 76 is included and coupled to intermediate point "C" on the bleeder (latter being a point of voltage division potential substantially corresponding to the potential developed by the rectifying action of diode 76), the effective source impedance is only $$\frac{2.5\times 2.5}{5}$$

or 1.25 megohms. Thus, it may be seen that with the same value of bleeder resistance between maximum focus potential and ground (and hence with the same power losses), use of the present invention results in a substantial reduction of source impedance, and therefore a significant improvement in regulation.

It may also be noted that variations of focus voltage with loading will be substantially zero at both extremes of adjustment of tap 80, the maximum variations occurring at an intermediate point in the adjustment range. In a conventional single rectifier bleeder type supply, variations of focus voltage with loading will be at a maximum in the minimum focus voltage setting.

While the embodiment illustrated in Figure 2 may involve slightly greater power losses than the embodiment of Figure 1 in achieving an equivalent regulation characteristic, the embodiment of Figure 2 has certain stability advantages, particularly during periods when no focus current is being drawn, which the embodiment of Figure 1 may lack.

While various embodiments of the present invention have been particularly described with relation to satisfying the focus voltage requirements of color kinescopes, it will be appreciated that advantage may be taken of the features of the present invention in voltage supplies utilized for satisfying the focus voltage requirements of other types of cathode ray tubes, such as electrostatically focused black-and-white kinescopes, or for other purposes apart from television apparatus.

Having thus described my invention, what is claimed is:

1. In a cathode ray tube system, a variable voltage supply comprising the combination of a deflection wave transformer, a pair of rectifying means respectively connected with similar polarity to spaced intermediate points on a winding of said transformer for developing respectively different unidirectional potentials at respective rectifying means output terminals, a voltage divider coupled between said rectifying means output terminals, a voltage supply output terminal, and means for adjustably coupling said voltage supply output terminal to said voltage divider.

2. In a television receiver including a cathode ray tube having a focus electrode, an adjustable focus supply comprising in combination a deflection wave transformer, rectifying means coupled to said transformer for developing a first unidirectional potential of a given polarity substantially corresponding to the maximum voltage required for said focus electrode, additional rectifying means coupled to said transformer for developing a second unidirectional potential of said given polarity substantially corresponding to the minimum voltage required for said focus electrode, a resistance, means for coupling said resistance between said first and said additional rectifying means, and means for adjustably coupling said focus electrode to said resistance.

3. A focus supply in accordance with claim 2 including an additional resistance coupled between said additional rectifying means and a point of reference potential.

4. In a television receiver including a cathode ray tube having an electrode with supply voltage requirements in a range extending between a first D.-C. potential and a second D.-C. potential, said receiver also including a deflection wave transformer subject to periodic appearances of flyback pulses, apparatus for supplying said cathode ray tube electrode with a voltage variable in said range comprising in combination a first rectifier, said first rectifier being coupled to a point on said transformer of flyback pulse potential of the order of said first D.-C. potential, a second rectifier, said second rectifier being coupled to a point on said transformer of flyback pulse potential of the order of said second D.-C. potential, a resistive voltage divider coupled between said first and second rectifiers, said resistive voltage divider having a variable tap, and means for coupling said electrode to said variable tap.

5. Apparatus in accordance with claim 4 including a resistor coupled between one of said rectifiers and a point of zero pulse potential.

6. In a color receiver including a kinescope having a focus electrode, said receiver also including a deflection wave transformer, a variable focus voltage supply comprising in combination rectifying means coupled to said transformer for developing at a first point a D.-C. potential corresponding to the maximum voltage required for said focus electrode, additional rectifying means coupled to said transformer for developing at a second point a D.-C. potential corresponding to the minimum voltage required for said focus electrode, a bleeder resistance connected between said first and second points, said bleeder resistance having an adjustable tap, and means for connecting said focus electrode to said tap.

7. In a color receiver including a kinescope having a focus electrode, said receiver also including a deflection wave transformer, a variable focus voltage supply comprising in combination rectifying means coupled to said transformer for developing at a first point a D.-C. potential corresponding to the maximum voltage required for said focus electrode, additional rectifying means coupled to said transformer for developing at a second point a D.-C. potential corresponding to the minimum voltage required for said focus electrode, a bleeder resistance connected between said first point and a point of reference potential, means for connecting said second point to a predetermined intermediate point on said bleeder resistance, said bleeder resistance having an adjustable tap, said tap being adjustable between said first point and said intermediate point, and means for connecting said focus electrode to said tap.

References Cited in the file of this patent

UNITED STATES PATENTS

| | | |
|---|---|---|
| 2,451,641 | Torsch | Oct. 19, 1948 |
| 2,459,602 | Ulman | Jan. 18, 1949 |
| 2,472,165 | Mankin | June 7, 1949 |
| 2,485,569 | Coughlin | Oct. 25, 1949 |
| 2,646,565 | Wilson | July 21, 1953 |
| 2,653,274 | Babcock | Sept. 22, 1953 |
| 2,668,910 | Starr | Feb. 9, 1954 |